US011760511B1

(12) United States Patent
Bradshaw et al.

(10) Patent No.: US 11,760,511 B1
(45) Date of Patent: Sep. 19, 2023

(54) UNMANNED AERIAL VEHICLE TRANSPORT DEVICES

(71) Applicant: The ADT Security Corporation, Boca Raton, FL (US)

(72) Inventors: Joshua Bradshaw, Wichita, KS (US); Trevor Greenberg, Louisville, KY (US); Michael Lavway, North Richland Hills, TX (US); Johnnie Donnell Singletary, Fort Worth, TX (US); Christopher Anthony Smith, Carrollton, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/088,351

(22) Filed: Dec. 23, 2022

(51) Int. Cl.
*B64U 70/99* (2023.01)
*B64U 80/00* (2023.01)

(52) U.S. Cl.
CPC ............. *B64U 70/99* (2023.01); *B64U 80/00* (2023.01)

(58) Field of Classification Search
CPC ........ B64U 70/92; B64U 70/99; B64U 80/00; B64U 80/70
See application file for complete search history.

(56) References Cited

U.S. PATENT DOCUMENTS

| | | | |
|---|---|---|---|
| 8,028,952 B2 | 10/2011 | Urnes, Sr. | |
| 10,988,267 B2 * | 4/2021 | Overall | B64C 39/024 |
| 2017/0225782 A1 * | 8/2017 | Kohstall | B64C 39/024 |
| 2019/0082148 A1 * | 3/2019 | Overall | H04N 7/185 |
| 2019/0233133 A1 * | 8/2019 | Overall | B64D 47/08 |
| 2019/0291864 A1 * | 9/2019 | Liu | G03B 15/006 |
| 2020/0017214 A1 * | 1/2020 | Bachmann | B64C 39/024 |
| 2020/0140085 A1 * | 5/2020 | Deng | B64D 47/08 |
| 2022/0072442 A1 * | 3/2022 | Abarzua Kocking | B64C 39/06 |

FOREIGN PATENT DOCUMENTS

EP 3705406 B1 12/2021

OTHER PUBLICATIONS http://web.archive.org/web/20210916105339/https://www.xt-xinte.com/FEICHAO-Long-Lens-Shooting-Bracket-Handheld-Landing-Gear-Stabilizer-Holder-Grip-for-DJI-FPV-Drone-Accessories-Replacement-Parts-p938264.html, Sep. 16, 2021.*

* cited by examiner

*Primary Examiner* — Benjamin P Lee
(74) *Attorney, Agent, or Firm* — Christopher & Weisberg, P.A.

(57) ABSTRACT

A transport device for transporting an unmanned aerial vehicle and methods for using the transport device are described herein. An example embodiment of the transport device includes: a carriage configured to engage the unmanned aerial vehicle; a plurality of engagement arms movably attached to the carriage and movable between a first locking position and a second locking position, each of the plurality of engagement arms, and configured to maintain engagement of the unmanned aerial vehicle by the carriage when in the first locking position; and a handle adapter having a first end configured for attachment to the carriage and a second end configured to receive an extension member.

19 Claims, 6 Drawing Sheets

UNMANNED AERIAL VEHICLE TRANSPORT DEVICES

TECHNICAL FIELD

The present technology is generally related to transport devices for unmanned aerial vehicles (UAVs).

BACKGROUND

Unmanned aerial vehicles, often referred to as "drones," have seen widespread use in any number of applications. Many UAVs use a quadcopter form factor in which a centralized body is attached to four arms, each of which supports a rotor used to provide lift and facilitate movement of the UAV.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments may reside in combinations of apparatus components and steps related to UAV transport devices. Accordingly, components have been represented where appropriate by conventional symbols in the drawings, focusing on those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, it is noted that where one side of the transport device 10 is shown, the shown side is representative of the similar and opposite, non-shown side.

Figure 1:
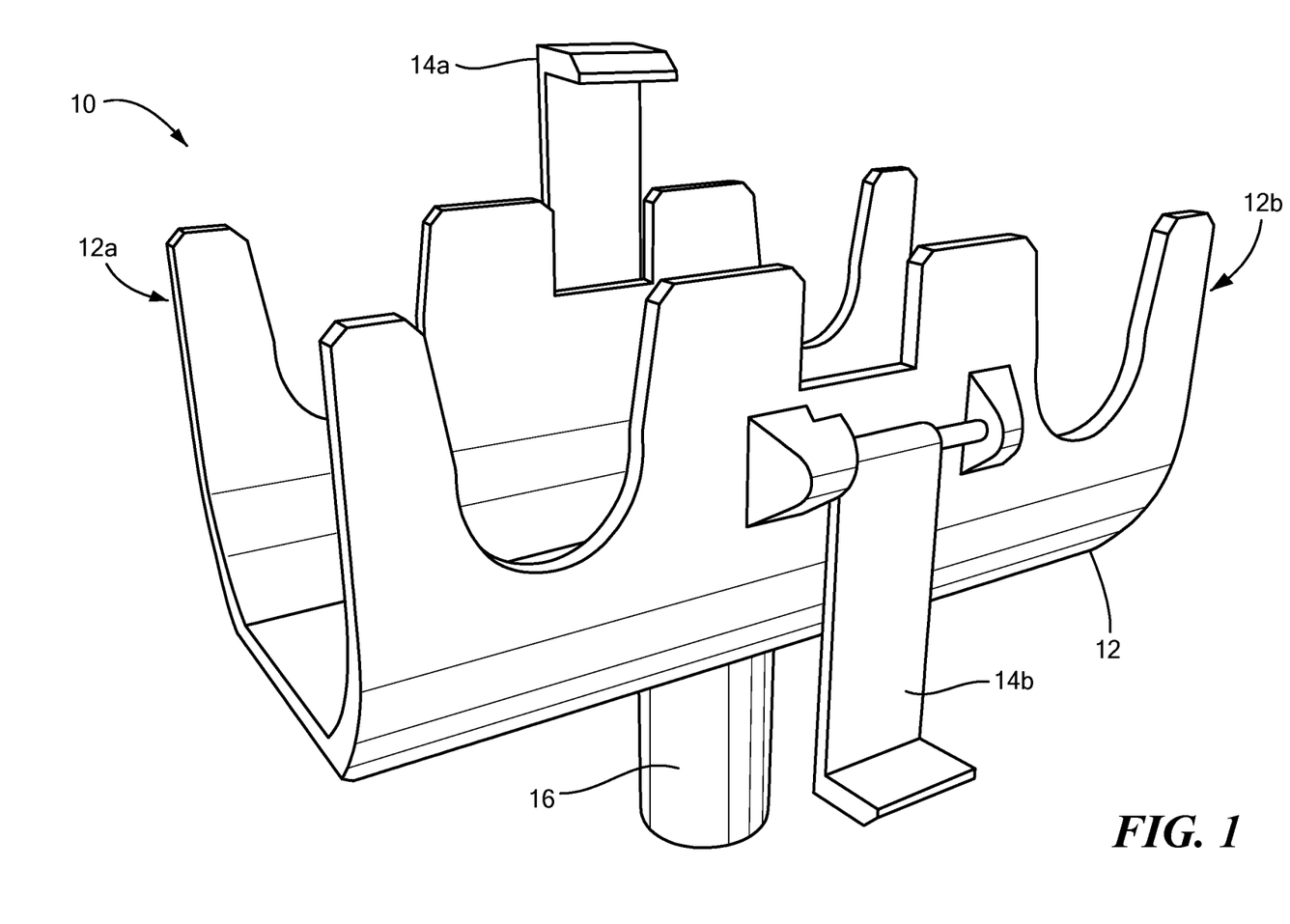
FIG. 1 is a top perspective view of an embodiment of a UAV transport device according to some embodiments of the present disclosure.
Figure 2:
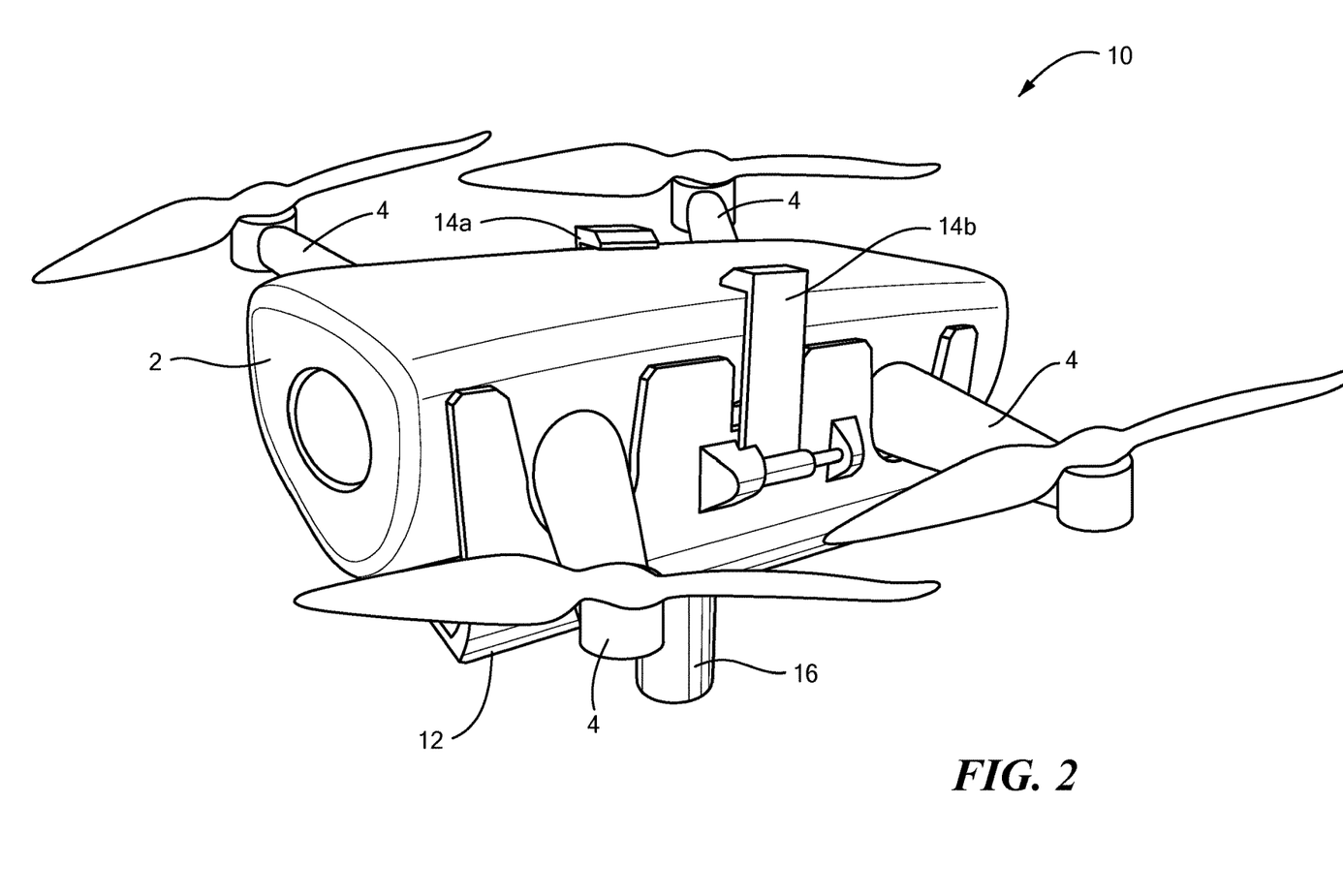
FIG. 2 is a view of an embodiment of a UAV transport device according to some embodiments of the present disclosure showing a retained UAV and the engagement arms in a retaining position.
Figure 3:
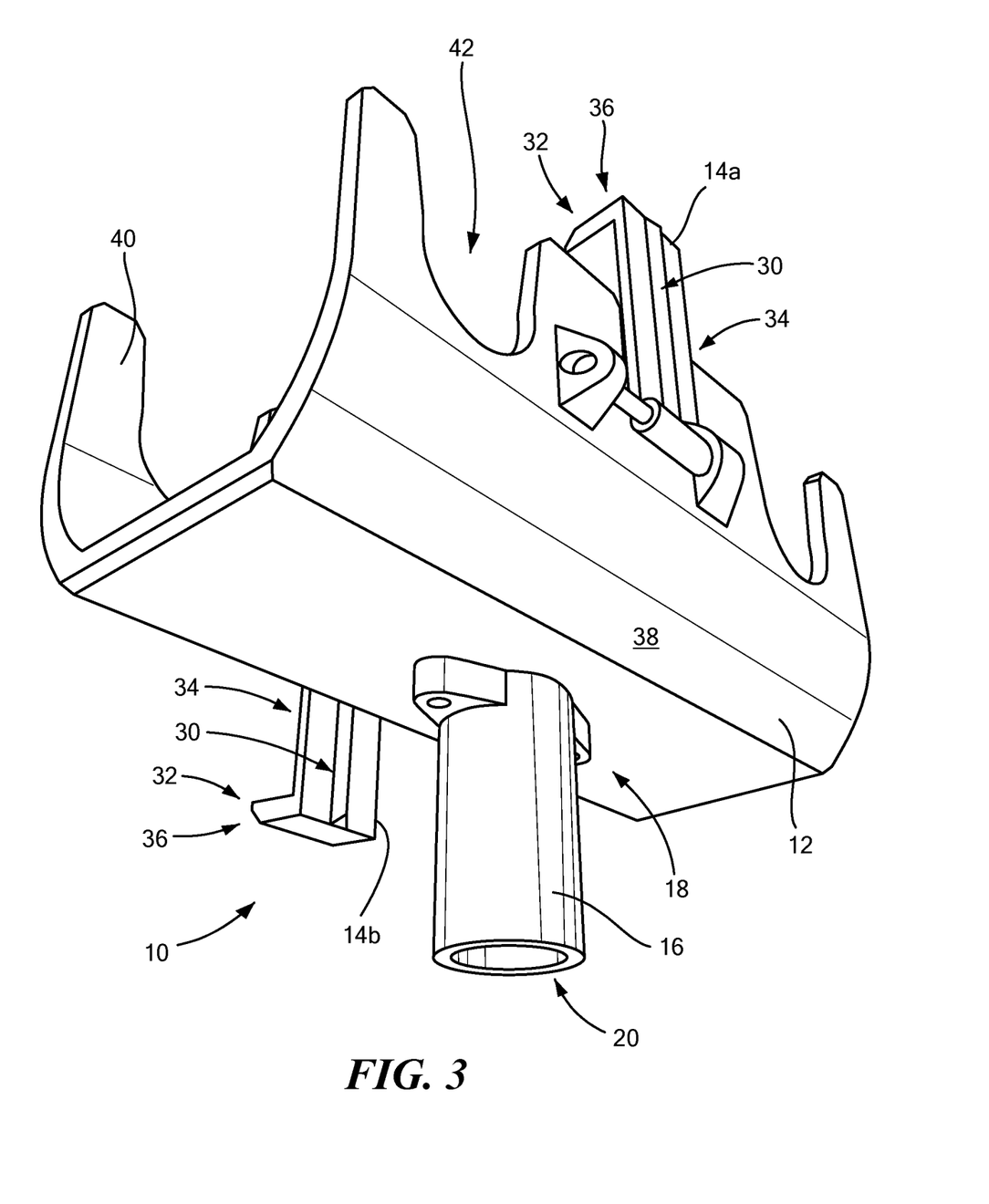
FIG. 3 is a rear-lower perspective view of an embodiment of a UAV transport device according to some embodiments of the present disclosure.

FIG. 1, FIG. 2, and FIG. 3 show an embodiment of a transport device 10. The transport device 10 includes a carriage 12 configured to engage a UAV 2. In some embodiments, the carriage 12 may be made of a plastic. The carriage may be configured as is appropriate depending on the form factor and/or configuration of the UAV 2. The example carriage 12 described herein may be configured for a quadcopter UAV 2. The transport device 10 includes at least one engagement arm 14, and preferably a plurality of engagement arms 14a, 14b (collectively referred to as engagement arms 14) pivotably attached to the carriage 12 and configured to maintain engagement of the UAV by the carriage 12, i.e., retain the UAV in the carriage 12, when in a first locking position, as discussed in further detail below. A handle adapter 16 having a first end 18 configured for attachment to the carriage 12 and a second end 20 configured to receive an extension member. The first end 18 may be attached to the carriage 12 by any suitable means, including but not limited to bolts and/or screws. This facilitates removal of the handle adapter 16 from the carriage 12, as discussed further below. In some embodiments, the handle adapter 16 can be formed as an integrated unit with the carriage 12.

In at least one embodiment, each of the plurality of engagement arms 14 are independently pivotable between a first locking position and a second locking position, each of the plurality of engagement arms 14 engaging the UAV and retaining the UAV in the carriage when in the first locking position but not when in the second locking position.

In at least one embodiment, the plurality of engagement arms 14 comprise a first engagement arm 14a and a second engagement arm 14b, the first engagement arm 14a being pivotably attached on a first side of the carriage 12a and the second engagement arm being pivotably attached on a second side of the carriage 12a. With specific reference to FIG. 1, engagement arm 14a is shown in the first locking position, and engagement arm 14b is shown in the second locking position. In at least one embodiment, the first side of the carriage 12a and the second side of the carriage 12b are opposing sides of the carriage 12.

In at least one embodiment, each of the plurality of engagement arms 14 comprises a flexible material of construction and a rigid portion configured to reinforce each of the engagement arms 14. In various embodiments, the flexible material of construction may be metal or plastic (e.g., Polylactic acid (PLA), Acrylonitrile butadiene styrene (ABS), and/or a thermoplastic polymer resin).

In at least one embodiment, each of the plurality of engagement arms 14 comprises a hooked portion 32 configured to maintain engagement of the UAV 2 by the carriage 12 when in a first locking position, such that the engagement arms 14 remain in contact with the UAV 2 while the UAV 2 is in the carriage. In at least one embodiment, the plurality of engagement arms 14 and carriage 12 cooperatively secure the UAV, such that removal of the UAV 2 from the carriage 12 may require moving at least one of the engagement arms 14 into the second locking position.

In at least one embodiment, the hooked portion 32 of each of the engagement arms 14 facilitates applying a downward force to the UAV 2 by the user to overcome a docking force applied between a docking station and the UAV 2, which may be but is not limited to a magnetic force. In operation, for a UAV 2 that is magnetically coupled to its docking station on a ceiling, the hooked portions 32 are placed around the UAV 2 body so that when the transport device 10 is pulled downward, it dislodges the UAV 2 from its magnetic lock, allowing the UAV 2 to be retained in the carriage 12. This can be done using a handle long enough to obviate the need for an operator to climb a ladder or to have to operate the UAV 2 to cause it to dislodge from the docking station to thereby land on the floor.

In at least one embodiment, the rigid portion 30 of each of the plurality of engagement arms 14 is on a proximate end 34 relative to the carriage 12, and the hooked portion 32 of each of the plurality of engagement arms is on a distal end 36 relative to the carriage.

In at least one embodiment the rigid portion 30 of each of the plurality of engagement arms 14 is less flexible than the hooked portion 32 of each of the plurality of engagement arms 14.

In at least one embodiment, the first end 18 of the handle adapter 16 attaches to (or is co-molded to and/or with a first surface 38 of the carriage 12, the first surface 38 of the carriage 12 being opposite a second surface 40 of the carriage 12 that is proximate the UAV when the UAV is engaged by the carriage 12.

In at least one embodiment, the handle adapter 16 is one of a plurality of handle adapters 16, each handle adapter 16 having a second end 20 different from the other handle adapters 16, each second end 20 being configured to mate with a respective extension member. In some embodiments, the handle adapter 16 may be made of a plastic. By way of non-limiting example, an extension member may be a broom stick (i.e., broom handle). A selected one of the plurality of handle adapters 16 may be configured to be mated to the broom stick by any of a friction fit, threads, a set screw, and/or permanent attachment such as by an adhesive (e.g., glue or epoxy).

In at least one embodiment, the carriage comprises a body 26 that has the first surface 38 configured to at least partially surround the UAV, the first surface 38 defining at least one channel 42 configured to receive a rotor arm 4 of the UAV.

Figure 4:
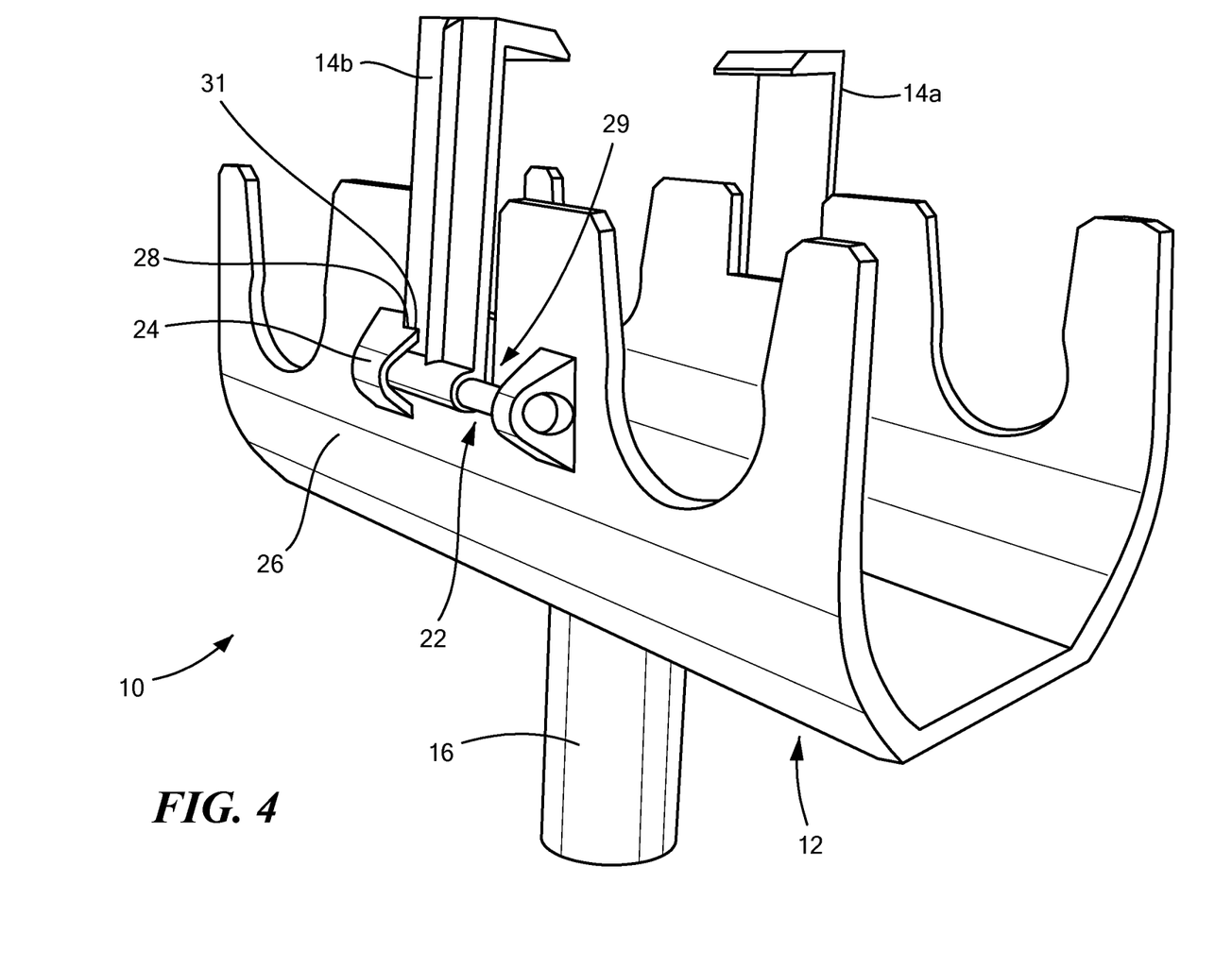
FIG. 4 is a side perspective view of an embodiment of a UAV transport device according to some embodiments of the present disclosure.
Figure 5:
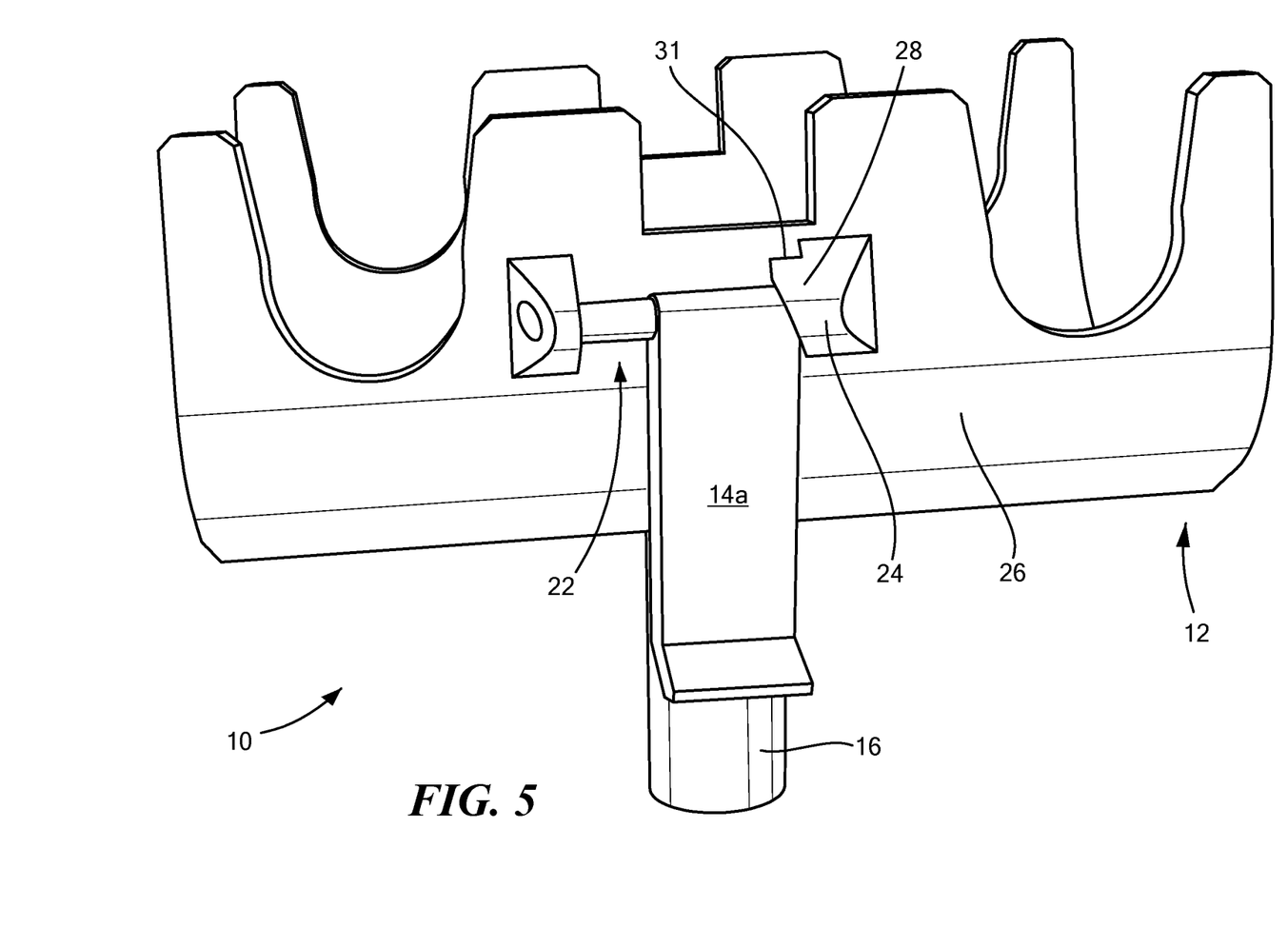
FIG. 5 is a side view of an embodiment of a UAV transport device according to some embodiments of the present disclosure.

There is shown in FIG. 4 and FIG. 5 an embodiment of the transport device 10. The transport device 10 includes a plurality of biasing members 22, each of the plurality of biasing members 22 applying a biasing force to a respective one of the plurality of engagement arms 14 (engagement arms 14a and 14b in the case of the embodiment of FIG. 4) to removably retain the respective engagement arm 14 in the second locking position.

In at least one embodiment, the carriage further comprises a plurality of retaining members 24, one of the plurality of biasing members 22 and a respective one of the plurality of retaining members 24 being configured to cooperatively removably retain the respective one of the engagement arms in one of the first locking position or the second locking position.

In at least one embodiment, the carriage 12 comprises a body 26, each of the plurality of retaining members 24 being defined by respective ones of a plurality of notched protrusions 28 extending from the body 26 of the carriage 12. In one embodiment, one of the retaining members 24 on each side of the body 26, e.g., carriage side 12a, has a notched protrusion 28 at the bottom to allow retainment of the engagement arm 14 in the second locking position, and the other one of the retaining members 24 one each side of the body 26, e.g., carriage side 12a, has a notched protrusion 28 at the top to allow retainment of the engagement arm 14 in the first locking position. Notches can be provided in one or the other or both the tops and bottoms of the notched protrusions 28 to allow engagement arms 14 to be locked in the first or second locking positions using either notched protrusion 28 on a given side of the body 26. In at least one embodiment, a notch 31 is formed on a portion of the notched protrusion 28. When the engagement arm 14 is in the first locking position, a portion of the engagement arm 14 is disposed in the notch 31 to facilitate retaining the engagement arm 14 in the first locking position.

Figure 6:
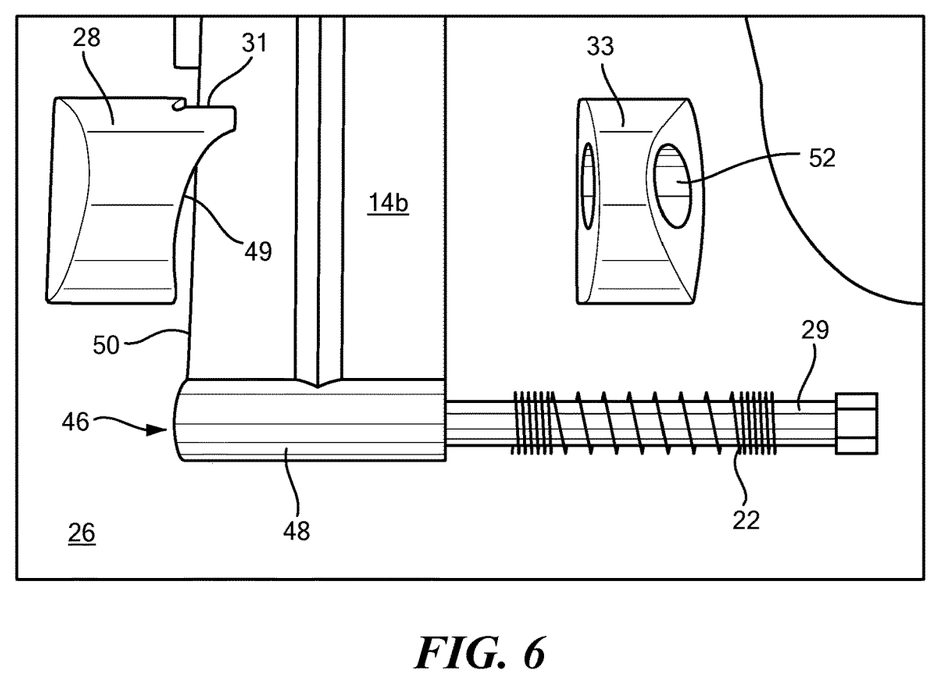
FIG. 6 is an enlarged view of a corresponding and partly disassembled portion of the embodiment of FIG. 4.

FIG. 6 shows an enlarged, partially disassembled view of a corresponding portion of FIG. 4. In operation, the shown portion is assembled as depicted in, e.g., FIG. 4.

In at least one embodiment, each of the plurality of biasing members 22 is configured to bias the respective one of the plurality of engagement arms 14 into the respective locking position one of the plurality of notched protrusions 28. In the case of an embodiment that includes a notch 31, the biasing force applied by the biasing members 22 biases the engagement arm into the notch 31 to facilitate retaining the engagement arm 14 in the first locking position.

In at least one embodiment, each of the plurality of retaining members 24 is configured to support respective ones of a plurality of longitudinal members 29. Each of the plurality of engagement arms 14 is pivotable about an axis defined by the respective one of the longitudinal members 29. Each of the plurality of biasing members 22 includes a spring wound around the respective one of the longitudinal members 29. In some embodiments, the longitudinal member 29 is a pivot point 46, which can be, by way of non-limiting example, a rod or bolt affixed at two end regions to the carriage 12 at hinges 44 defined by and/or part of the notched protrusions 28 and/or a supporting protrusion 33, with the engagement arm 14 having an open or closed loop at the pivot end 48 through which the pivot point 46 is inserted. The supporting protrusion 33 may include an aperture 52 configured to receive the longitudinal member 29. In some embodiments, each of the plurality of biasing members 22 biases the respective one of the plurality of engagement arms 14 into a respective notch 31 in one of the plurality of notched protrusions 28.

In some embodiments, the loop at the pivot end 48 of the engagement arm 14 can be arranged to allow the engagement arm 14 to slide along the pivot point 46 to allow the engagement arm 14 to move laterally between the end regions. Lateral movement of the engagement arm 14 along the pivot point 46 to overcome the force of the biasing member 22 moves the engagement arm 14 from one of the first or second locked positions and in an unlocked position, from which the engagement arm 14 can be released to return to its most recent disposition in either the first or second locking position, or pivoted to be released and thereby disposed in the other of the two locking positions.

In at least one embodiment, the notched protrusion 28 includes a sloped surface 49. The sloped surface 29 contacts the engagement arm 14 on an outer edge 50. The engagement arm 14 slides along the sloped surface 49, which facilitates retention of the engagement arm 14 in an open, i.e., the second locking, position.

Figure 7:
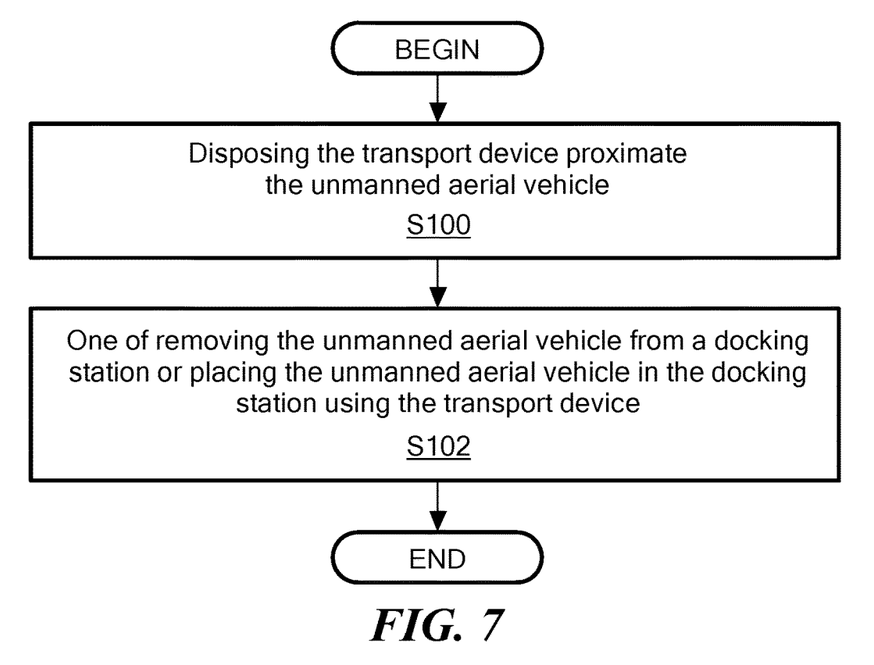
FIG. 7 is a flowchart of an example process for using a UAV transport device according to some embodiments of the present disclosure.

FIG. 7 is a flowchart of an example process according to some embodiments of the present disclosure. One or more blocks described herein may be performed by, for example, a user of any of the embodiments of a transport device 10 described herein to transport a UAV. The method includes disposing the transport device 10 proximate the UAV (Block S100) and one of removing the UAV from a docking station or placing the UAV in the docking station using the transport device (Block S102).

In at least one embodiment, removing the UAV from the docking station comprises: disposing each of the plurality of engagement arms 14 in the first locking position; engaging the UAV with the carriage 12 by moving the carriage 12 toward the UAV a sufficient distance to engage the UAV with the plurality of engagement arms 14; and moving the carriage 12 away from the docking station with a force greater than a docking force between the UAV and the docking station. In at least one embodiment, the force supplied by the docking station to retain the UAV is magnetic.

In at least one embodiment, placing the UAV in the docking station comprises: disposing the plurality of engagement arms 14 in the second locking position; placing the UAV in the carriage 12; and moving the carriage 12 toward the docking station to cause the docking station to engage, e.g., by magnetic engagement, the UAV.

In at least one embodiment, disposing each of the plurality of engagement arms in the other of the first or second locking position comprises disposing each of the plurality of engagement arms in the desired locking position by overcoming a biasing force applied by a plurality of biasing members pivoting each of the plurality of engagement arms to align with the other of the first or second locking position, and moving each of the plurality of engagement arms into the other of the first or second locking position by engagement with a notched protrusion 28.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A transport device for an unmanned aerial vehicle, the transport device comprising:
   a carriage configured to engage the unmanned aerial vehicle, the carriage comprising a body, the body having a first surface configured to at least partially surround the unmanned aerial vehicle, the first surface defining a channel configured to receive a rotor arm of the unmanned aerial vehicle;
   a plurality of engagement arms movably attached to the carriage and movable between a first locking position and a second locking position, each of the plurality of engagement arms configured to maintain engagement of the unmanned aerial vehicle by the carriage when in the first locking position; and
   a handle adapter having a first end configured for attachment to the carriage and a second end configured to receive an extension member.

2. The transport device of claim 1, wherein each of the plurality of engagement arms is independently pivotable between the first locking position and the second locking position, each of the plurality of engagement arms engaging the unmanned aerial vehicle when in the first locking position but not when in the second locking position.

3. The transport device of claim 2, further comprising a plurality of biasing members, each of the plurality of biasing members applying a biasing force to a respective one of the plurality of engagement arms to removably retain the respective engagement arm in the second locking position.

4. The transport device of claim 3, wherein the carriage further comprises a plurality of retaining members, one of the plurality of biasing members and a respective one of the plurality of retaining members being configured to cooperatively removably retain the respective one of the engagement arms in one of the first locking position or the second locking position.

5. The transport device of claim 4, wherein each of the plurality of retaining members is defined by respective ones of a plurality of notched protrusions extending from the body of the carriage.

6. The transport device of claim 5, wherein each of the plurality of notched protrusions comprises a notch, and wherein each of the plurality of biasing members biases the respective one of the plurality of engagement arms into a respective notch in one of the plurality of notched protrusions.

7. The transport device of claim 5, wherein:
   each of the plurality of retaining members is configured to support respective ones of a plurality of longitudinal members;
   each of the plurality of engagement arms being rotatable about an axis defined by the respective one of the longitudinal members; and
   each of the plurality of biasing members being a spring wound around the respective one of the longitudinal members.

8. The transport device of claim 1, wherein the plurality of engagement arms comprise a first engagement arm and a second engagement arm, the first engagement arm being attached on a first side of the carriage and the second engagement arm being attached on a second side of the carriage.

9. The transport device of claim 8, wherein the first side of the carriage and the second side of the carriage are opposing sides of the carriage.

10. The transport device of claim 1, wherein each of the plurality of engagement arms comprises:
a flexible material of construction; and
a rigid portion configured to reinforce each of the engagement arms.

11. The transport device of claim 10, wherein each of the plurality of engagement arms comprises a hooked portion configured to maintain engagement of the unmanned aerial vehicle by the carriage when in a first locking position.

12. The transport device of claim 11, wherein the rigid portion of each of the plurality of engagement arms is on a proximate end relative to the carriage, and the hooked portion of each of the plurality of engagement arms is on a distal end relative to the carriage.

13. The transport device of claim 11, wherein the rigid portion of each of the plurality of engagement arms is less flexible than the hooked portion of each of the plurality of engagement arms.

14. The transport device of claim 1, wherein the first end of the handle adapter attaches to the first surface of the carriage, the first surface of the carriage being opposite a second surface of the carriage that is proximate the unmanned aerial vehicle when the unmanned aerial vehicle is engaged by the carriage.

15. The transport device of claim 14, wherein the handle adapter is one of a plurality of handle adapters, each of the plurality of handle adapters having a second end different from the other handle adapters, each second end being configured to mate with a respective extension member.

16. A method of transporting an unmanned aerial vehicle using a transport device comprising a carriage configured to engage the unmanned aerial vehicle; the carriage comprising a body, the body having a first surface configured to at least partially surround the unmanned aerial vehicle, the first surface defining a channel configured to receive a rotor arm of the unmanned aerial vehicle; a plurality of engagement arms attached to the carriage; each of the plurality of engagement arms being independently pivotable between a first locking position and a second locking position, each of the plurality of engagement arms engaging the unmanned aerial vehicle when in the first locking position but not engaging the unmanned aerial vehicle when in the second locking position; and a handle adapter having a first end configured for attachment to the carriage and a second end configured to receive an extension member, the method comprising:
disposing the transport device proximate the unmanned aerial vehicle; and
one of removing the unmanned aerial vehicle from a docking station or placing the unmanned aerial vehicle in the docking station using the transport device.

17. The method of claim 16, wherein removing the unmanned aerial vehicle from the docking station comprises:
disposing each of the plurality of engagement arms in the first locking position;
engaging the unmanned aerial vehicle with the carriage by moving the carriage toward the unmanned aerial vehicle a sufficient distance to engage the unmanned aerial vehicle with the plurality of engagement arms; and
moving the carriage away from the docking station with a force greater than a docking force between the unmanned aerial vehicle and the docking station.

18. The method of claim 16, wherein placing the unmanned aerial vehicle in the docking station comprises:
disposing the plurality of engagement arms in the second locking position;
placing the unmanned aerial vehicle in the carriage; and
moving the carriage toward the docking station to cause the docking station to engage the unmanned aerial vehicle.

19. The method of claim 16, wherein disposing each of the plurality of engagement arms in the other of the first or second locking position comprises disposing each of the plurality of engagement arms in an unlocked position by overcoming a biasing force applied by a plurality of biasing members pivoting each of the plurality of engagement arms to align with the other of the first or second locking position, and moving each of the plurality of engagement arms into the other of the first or second locking position.

* * * * *